(12) United States Patent
Langenecker

(10) Patent No.: US 6,601,787 B1
(45) Date of Patent: Aug. 5, 2003

(54) METHOD AND AN APPARATUS FOR MANAGING CONTAMINATED MATERIAL

(76) Inventor: Bertwin Langenecker, 29 Woodside Dr., Moraga, CA (US) 94556

( * ) Notice: Subject to any disclaimer, the term of this patent is extended or adjusted under 35 U.S.C. 154(b) by 106 days.

(21) Appl. No.: 09/655,032

(22) Filed: Sep. 3, 2000

Related U.S. Application Data

(60) Provisional application No. 60/230,223, filed on Aug. 31, 2000.

(51) Int. Cl.[7] .............................................. B02C 19/12
(52) U.S. Cl. ........................ 241/21; 241/38; 241/101.2; 241/DIG. 14
(58) Field of Search ................................ 241/21, 101.8, 241/38, DIG. 14, 24.12, 24.13, 24.14, 24.15, 101.2

(56) References Cited

U.S. PATENT DOCUMENTS

| | | | | |
|---|---|---|---|---|
| 4,923,125 A | * | 5/1990 | Bateson et al. ............... | 241/20 |
| 5,223,147 A | * | 6/1993 | Rosenstock et al. ......... | 210/705 |
| 5,248,098 A | * | 9/1993 | Schade ......................... | 241/23 |
| 5,316,223 A | * | 5/1994 | Lahoda et al. ................ | 241/20 |
| 5,421,527 A | * | 6/1995 | Corte .......................... | 241/20 |
| 5,829,691 A | * | 11/1998 | Gaudin .................... | 241/46.01 |
| 6,082,548 A | * | 7/2000 | Stephenson et al. .......... | 209/4 |

* cited by examiner

Primary Examiner—Mark Rosenbaum
(74) Attorney, Agent, or Firm—Blakely, Sokoloff, Taylor & Zafman LLP

(57) ABSTRACT

A method includes mixing a contaminated material with water in a wet-type mixing and grinding mill. The water is agitated. The Agitated water goes through the contaminated material. Larger particles are separated from smaller particles by an alternating and mechanical energy field acting in the mixing and grinding mill. An eluate is exposed to mechano-chemically activated sorbens material. The solids are separated from the water.

15 Claims, 8 Drawing Sheets

METHOD AND AN APPARATUS FOR MANAGING CONTAMINATED MATERIAL

This application claims the benefit of Provisional Application No. 60/203,223, filed Aug. 31, 2000.

This application claims the benefit of the earlier filing date of co-pending non-provisional application of Bertwin Langenecker entitled, "Method and Apparatus for Decontaminating Soil and Mud Polluted with Hazardous Waste and Petroleum Products," Ser. No. 09/285,896, filed Apr. 9, 1998 and incorporated herein by reference.

BACKGROUND

1. Field of the Invention

The invention relates generally to environmental technology and more specifically to a method for the decontamination of a contaminated material such as soil, mud, sludge, or other material contaminated with substance(s) such as a hazardous waste, hazardous substances, hazardous constituents, pollutant, contaminant, hazardous material, or petroleum.

2. Background

As public awareness has increased regarding the detrimental effects of pollution, environmental laws and regulations for the protection of human health and the environment have become more strict. The disposal of waste, particularly contaminated waste (e.g., hazardous waste, solid waste, waste contaminated with petroleum, etc.,) has been significantly more regulated. Environmental laws and regulations have made it increasingly more difficult for new sites such as landfills or treatment, storage, and disposal facilities (TSD facilities) from receiving permits to operate from governmental agencies such as the United States Environmental Protection Agency (USEPA) or a State Environmental Protection Agency (State EPA). Additionally, the granting of permits is also affected by complaints from individuals located in the area where the potential landfill or TSD facility is to be operated. A common complaint from such individuals is that they do not want a landfill or a TSD facility located in their neighborhood or community.

While the disposal capacity of landfills and TSD facilities has generally decreased over the years, the amount of waste generated by industry and individuals has increased. This has resulted in a shortage of disposal capacity. Consequently, the cost of disposing of contaminated material has dramatically increased.

In an attempt to alleviate these problems, generators of hazardous waste and TSD facilities that manage hazardous waste are required under federal and state law to minimize hazardous waste and to explain the efforts that they have made in order to accomplish this task. Despite the increased cost of disposal of solid waste and the legal requirements to minimize hazardous waste, the technology for disposal of contaminated material such as contaminated soil has generally remained unchanged. Typically, contaminated material is treated or remains untreated and is disposed of at a landfill. For example, soil contaminated with a hazardous waste is typically treated to comply with the land disposal requirements of state and federal law. The soil is then disposed of at a high cost at a landfill permitted to accept soil contaminated with hazardous waste. Another example relates to soil contaminated with petroleum. Typically, any soil contaminated with petroleum is transported directly to a landfill permitted to accept soil contaminated with petroleum.

Given the high cost associated with disposing of contaminated material and the limited disposal capacity, it is desirable to have a method and apparatus capable of reducing the contaminated material that is actually disposed and the cost of disposing of the contaminated waste.

SUMMARY OF THE INVENTION

Techniques of the invention relate to reducing the amount of contaminated material disposed of, and in turn, reducing the cost of disposing of contaminated material. Contaminated material is soil, mud, sludge, etc. contaminated with substances such as hazardous waste, hazardous constituent, pollutant, contaminant, hazardous substance, hazardous material, petroleum, or crude oil. One embodiment of the invention relates to mixing a contaminated material with water in a wet-type mixing and grinding mill and agitating the mixture. The agitation of the mixture produces turbulence that reduces the surface tension of the water. Larger particles are separated from smaller particles of the contaminated material by alternating forces acting in the mixing and grinding mill. In another embodiment of the invention, the contaminated water is exposed to a mechano-chemically activated sorption medium. Other features and advantages of the invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

One embodiment of the invention relates to reducing the cost and the amount of contaminated material that is disposed of at a landfill or a treatment, storage, and disposal facility (TSD facility). Contaminated material includes soil, sludge, mud, etc. contaminated with a substance. For purposes of the description herein, substance includes hazardous waste, hazardous constituent, pollutant, contaminant, hazardous substance, hazardous material, petroleum, crude oil or any other substance that is toxic to human health or the environment. Hazardous waste and hazardous constituent are defined under the Solid Waste Disposal Act as amended by the Resource Conservation Recovery Act of 1976 (RCRA), 42 U.S.C. §6901 et seq. further amended by the Hazardous and Solid Waste Amendments of 1984 and the regulations promulgated thereunder. Hazardous substance is defined under the Comprehensive Environmental Response, Compensation, and Liability Act, 42 U.S.C. §9614 and the regulations promulgated thereunder. Hazardous substance is also defined under the Toxic Substances Control Act, 42 U.S.C. §2601 et seq. and the regulations promulgated thereunder. Hazardous materials are defined by the Occupational Safety and Healthy Administration and the regulations promulgated thereunder.

The following detailed description and the accompanying drawings are provided for the purpose of describing and illustrating presently preferred embodiments of the invention only, and are not intended to limit the scope of the invention in any way.

Figure 1:
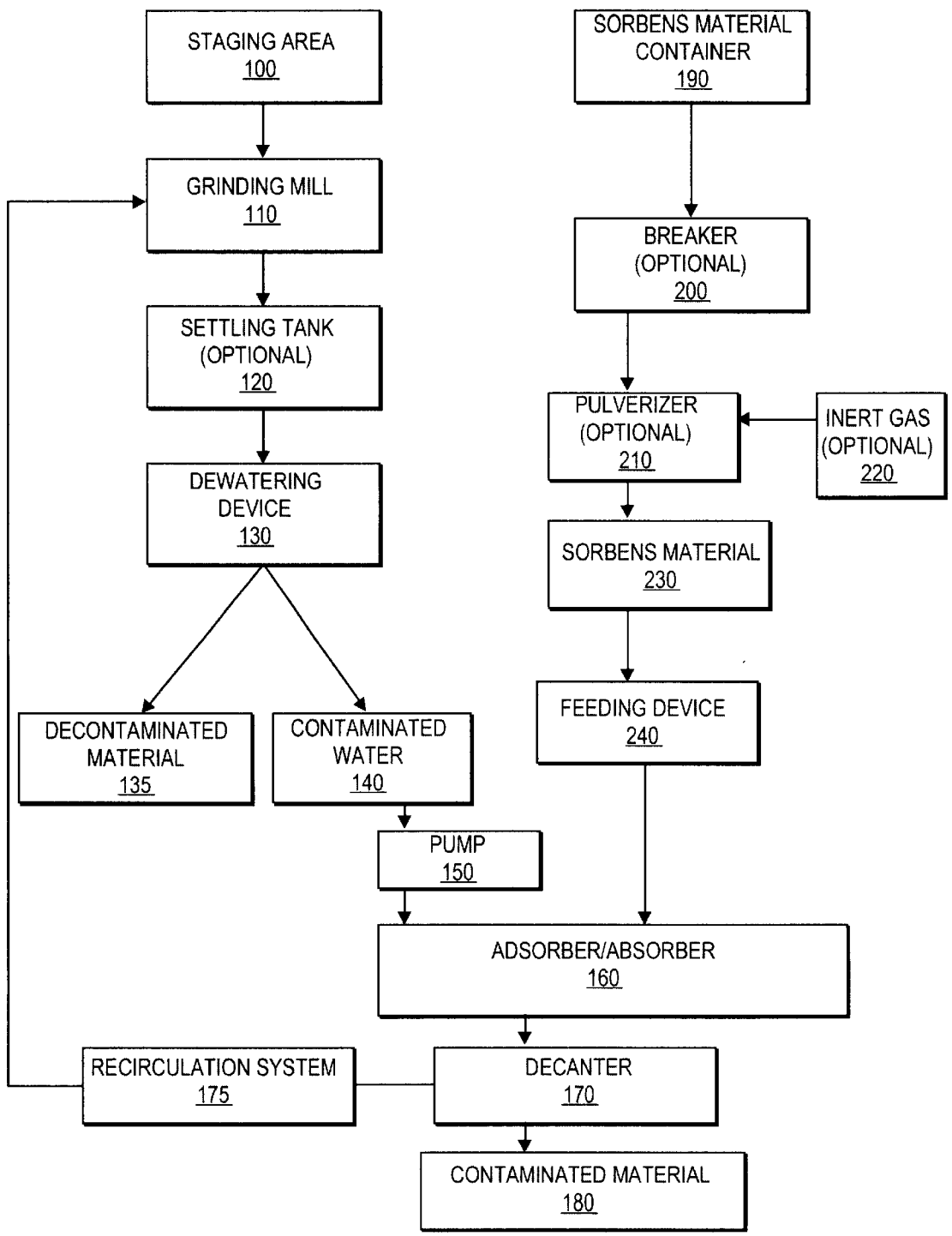
FIG. 1 is a block diagram illustrating a treatment method in accordance with one embodiment of the invention.

FIG. 1 is a block diagram illustrating a treatment method in accordance with one embodiment of the invention. Contaminated material such as soil generally results from a spill or a release of substance(s) into the environment, typically land, water, or air. In the example of a spill or release into land, the contaminated soil is typically excavated and moved or transported to a staging area such as staging area 100. Debris and large rocks are removed from the contaminated soil by sifting (not shown) through the soil. This may be accomplished by an individual manually sifting through the contaminated soil or a conventional mechanical operation may be used that separates the debris, large rocks, etc. from the smaller particles such as the contaminated soil. If the debris and large rocks are contaminated, the debris and large rocks may then be properly disposed in accordance with any applicable state and federal law. The remaining contaminated material enters a wet-type mixing and grinding mill 110. Grinding mill 110 mixes contaminated material with turbulently streaming wash water that may be fresh water or recycled water through recirculation system 175. The mixture of contaminated material and water is then strongly agitated by grinding mill 110. At about the same time, chunks of contaminated soil are ground into smaller particles that are separated in the agitating field of alternating pressures in grinding mill 110.

The wet-type grinding has a superimposed alternating mechanical field that can be achieved by ball mills, rod mills, or other suitable devices. One skilled in the art will appreciate that the alternating mechanical field is known in the art and may depend upon factors such as the distance of one pin (or beaters) from another pin of a plurality of pins. Additionally, the revolutions per minute (RPM) of the pin disk that holds the pins or the beaters also affects the alternating mechanical field. Either of these factors may be adjusted in order to obtain an adequate alternating mechanical field. At a throughput on the order of about ≦15 tons of contaminated material per hour, universal grinding mills may be used with various types of grinding tools that may be adapted to the contaminated material to be treated.

In the next operation, the contaminated water (e.g., eluate) is drained out of grinding mill 110 and pumped to adsorber/absorber 160. The contaminated material may then be optionally sent to settling tank 120 in order to separate solids from water. The solids and water are then sent to a dewatering device such as a filter press, centrifuge, or other suitable device 130 that removes the water from the solid material. If testing for substances shows that the soil, mud, etc. is "clean", then the now decontaminated material 135 such as a filter cake containing 30–65% solids may be used on site with the permission from USEPA or State EPA, if necessary or any other suitable purpose. If unacceptable levels of substances are still present, the contaminated material may be subjected to another cycle of similar treatment in grinding mill 110.

Contaminated water 140 exiting dewatering device 130 (e.g., eluate, centrate, filter effluent, filtrate) is pumped by a pump 150 such as a commercially available Mohno pump or other suitable pump into adsorber/absorber 160. Adsorber/absorber 160 is used to remove the substance(s) contained in contaminated water 140 by exposing sorbens material 230 to contaminated water 140. Sorbens material is typically in the solid phase but also may be in the liquid or gaseous phase. If liquid or gaseous sorbens are used, then breaker 200 and pulverizer 210 are unnecessary to the decontamination process. Contaminated water 140 is mixed with sorbens material 230 from sorbens material container 190 in adsorber/absorber 160.

Sorbens material 230 includes adsorbents or absorbents. An adsorbent generally has the ability to hold molecules of other substances on its surface (e.g., lignite, activated carbon, etc.). In contrast, an absorbent is generally a compound that penetrates another compound. In implementing the techniques of the invention, it is preferable to use an adsorbent such as lignite (e.g., brown coal, woodcoal).

Sorbens material 230 is more effective when a greater surface of the sorbens material 230 is exposed to contaminated water 140. In order to create a greater surface area of sorbens material 230, sorbens material 230 is sent to breaker 200. At breaker 200, sorbens material 230 is broken into smaller particles. These smaller particles are then sent to pulverizer 210. Pulverizer 210 then makes these smaller particles even smaller 230.

The multiple surfaces, created by pulverizing the sorbens material 230 makes the sorbens material more efficient for removing the substances from contaminated water 140 into adsorber/absorber 160. This occurs under the impact of high alternating pressures created in grinding mill 110 split or gap between the empty space in the tools (e.g. gap between pins) of the pulverizer activates and enhances mechano-chemical reactions.

In order to prevent self ignition or explosion, as well as to preserve the activated surfaces of the pulverized sorbens material until the sorbens material 230 reaches the inside of adsorber/absorber 160, it is recommended that the sorbens material 230 be pulverized in an atmosphere of inert gas. Preferably nitrogen is used as the inert gas. The inert gas may also be used to regulate the temperature profile in adsorber/absorber 160 since the inert gas may be applied at any desired temperature.

Following the mechano-chemically activated process in adsorber/absorber 160, the solids from sorbens materials 230 are separated from the water that was cleaned by sorbens material 230 in decanter 170. It will be appreciated that any other suitable device may be used in place of decanter 110 to separate water and solids such as a separator.

The clean water from decanter 170 is generally free of substances such as hazardous waste, hazardous constituent, pollutant, contaminant, hazardous substance, hazardous material, petroleum, crude oil. After the water has been determined to meet applicable standards specified by the U.S. EPA, State EPA, or a local government agency, the water is returned to the environment and may be released to, for example, a POTW, or other permitted means to the environment. Solids 180 removed from decanter 170 carry the substance extracted from the contaminated material. Solids 180 may be required to be treated and disposed as a hazardous waste, solid waste, or may undergo recycling of valuable elements by recycling the sorbens material.

Studies have shown that the volume of contaminated material 180 amounts to about 1 to 1.5 percent of the original volume percent of the contaminated material. Accordingly, techniques of the invention significantly reduce the amount of contaminated material that must be disposed of at a TSD facility or other permitted facility. This reduces the volume of, for example, hazardous waste disposed of at a TSD facility.

Figure 2:
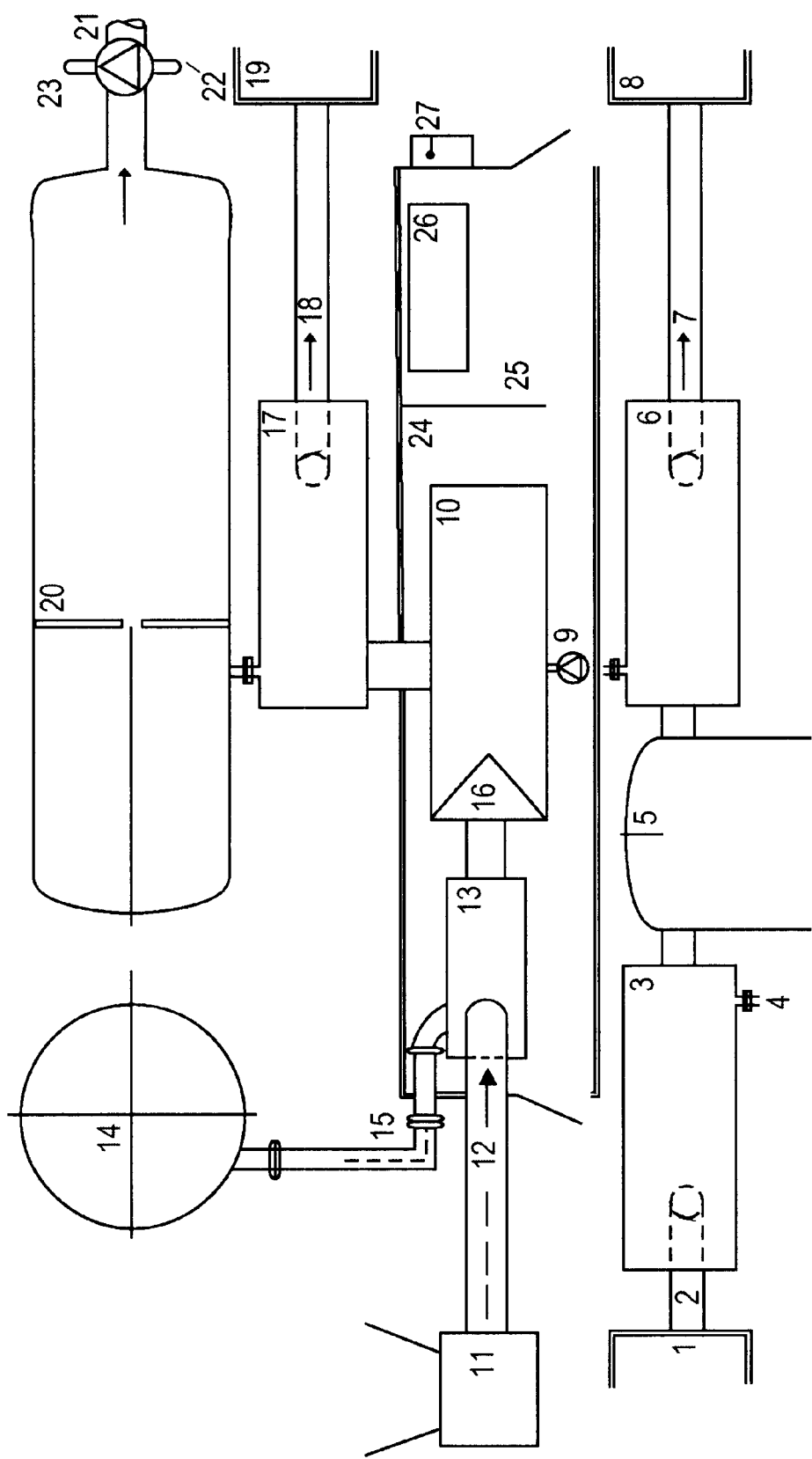
FIG. 2 is a schematic diagram of an apparatus used to reduce contaminated material in accordance with one embodiment of the invention.

FIG. 2 illustrates a schematic diagram of the overall process in accordance with one embodiment of the invention. Specifically, FIG. 2 illustrates staging area 1, from which the soil is removed and fed by means of belt or screw conveyor 2 or the like, into the wet-type mixing and grinding mill 3. In grinding mill 3, the soil and mud is mixed intimately with water (e.g., industrial process water) pumped into grinding mill 3 through inlet 4. In grinding mill 3, the mixture of water and contaminated material is agitated to produce intense turbulences that reduces the surface tension of the water and enhances the separation of the smaller solid particles from larger particles of the contaminated material. It will be appreciated by one skilled in the art that settling tanks and dewatering device 6 described below perform the substantial portion of water solid separation.

Figure 3:
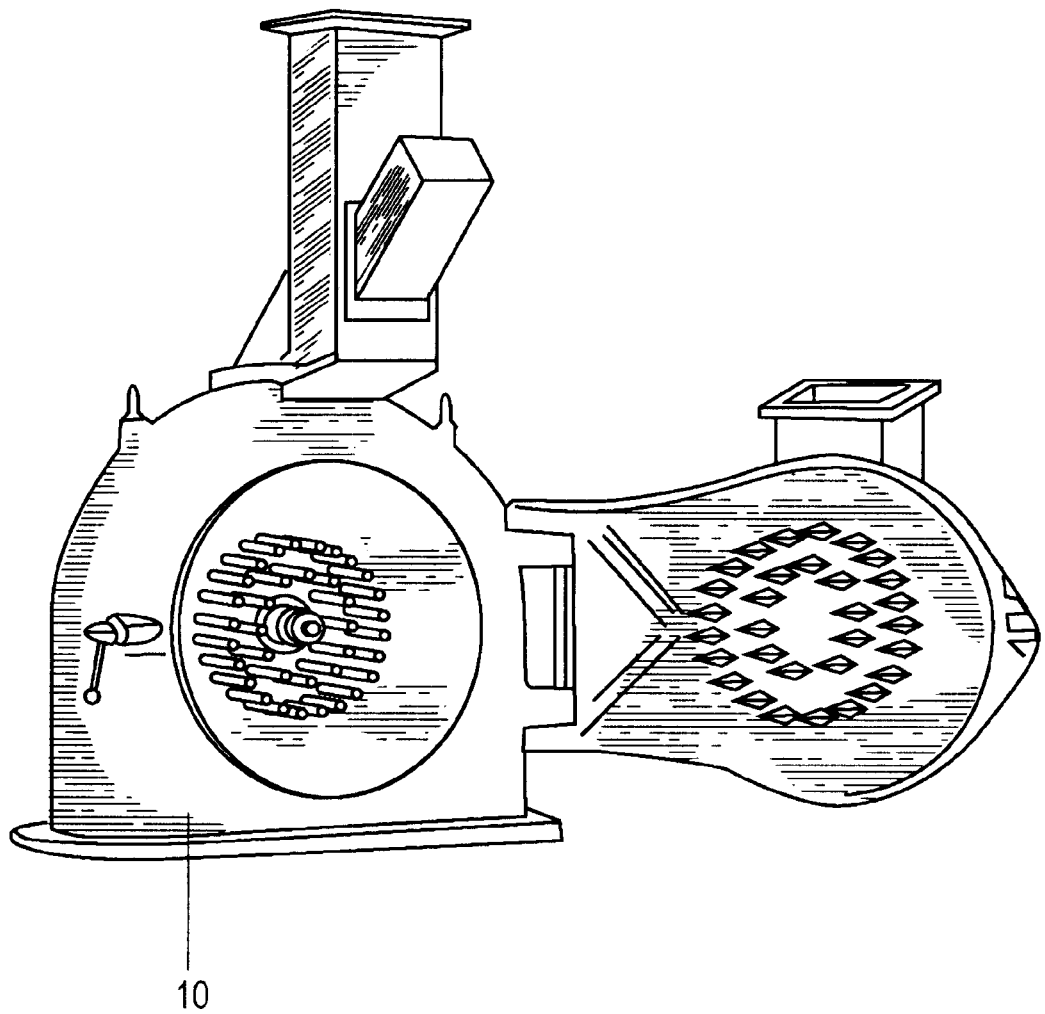
FIG. 3 is a perspective view of a wet mixing and grinding mill in accordance with one embodiment of the invention.

Techniques of the invention have been implemented with a (universal-) grinding mill as the wet-type mixing and grinding mill 3 illustrated in FIG. 3. Grinding mill 3 is equipped with a beater disk capable of accepting and grinding lumps of soil such as lumps having diameters up to an inch of soil and mud. Powered by a 37-kilowatt (KW) electric motor, grinding mill 3 has a throughput of $\leq 4$ (metric) tons of contaminated material per hour at 3,000 rpm. For large throughputs in the order of magnitude of 100 tons of contaminated material per hour, wet-type rod and ball mills could be used and grinding mill 3 could be powered by (electric) motors having up to 1,000 KW power.

In settling tank 5, some of the solid material sinks to the bottom of the tank (e.g., tank bottoms) by gravity, while the rest of solids contained in the mixture leaving grinding mill 3, is dehydrated in dewatering device 6 such as a filter press. The separated solids are removed from dewatering device 6 by belt or screw conveyor 7 and placed into container 8. If the solid decontaminated material is determined to be nonhazardous, the solid material may be managed in a variety of ways that may be approved by the State EPA or a local government agency such as leaving the solid material at the site from which the solid material was initially excavated, transporting the solid material to a solid waste landfill or any other permitted means of managing the solid material. Alternatively, in the unlikely event that the solid material still meets the definition of hazardous waste under RCRA such as a listed hazardous waste, the solid material should be transported to a TSD facility for disposal.

The contaminated water exiting dewatering device 6 is pumped by pump 9 such as a Mohno pump into adsorber/absorber 10. In adsorber/absorber 10, the contaminated water is mixed with a sorbens material (e.g., lignite) that is broken into small pieces (e.g., pieces having a diameter $\leq 17.5$ mm, ½ inch) in breaker 11. The sorbens material is transported by conveyor 12 such as a screw conveyor to pulverizer 13 where the sorbens material is made into smaller particles.

Pulverizer 13 is similar to adsorber/absorber 10 in that adsorber/absorber 10 may be modified in such a way that adsorber/absorber 10 may include equipment to perform the functions of, for example, breaker 11 and/or pulverizer 13. To illustrate, the one difference between pulverizer 13 and adsorber/absorber 10 is that pulverizer 13 is equipped with a vortex rotor. A vortex rotor could be added to adsorber/absorber 10 in order to perform the function of pulverizer 13. In one embodiment, the vortex rotor is specifically designed for pulverizing particles in the diameter range of about a few microns.

In one embodiment, pulverizer 13, powered by an electric motor of 6 KW at 6,000 rpm had throughput of $\leq 70$ kg/h of a sorbens material such as lignite in a powder form. About 40–60 kg/h lignite was used to adsorb the substances in the contaminated water that was generated from contaminated material of $\leq 4$ tons per hour in mixing and grinding mill 3.

To prevent self-ignition and explosions during pulverizing in pulverizer 13, the sorbens material such as lignite is ground in an atmosphere of inert gas (e.g., nitrogen) stored in the tank 14 and fed into grinding mill 3 through pipe 15. The pulverized sorbens enters adsorber/absorber 10 through feeding device 16. The amount of sorbens material is dependent upon the amount of eluate in adsorber/absorber 10. Lignite (e.g., brown coal, wood coal) is the preferred sorbens material. Lignite has 30–50 $m^2/g$ active surface and is much more economical than other sorbens materials. Commercially activated carbon may also be used. Commercially activated coal has active surfaces of up to several hundred $m^2/g$, typically up to about 700 $m^2/g$. It will also be appreciated by one skilled in the art that the sorbens material is more efficient if the pH of the fluid in adsorber/absorber 10 is about 8–11.

From adsorber/absorber 10, the mixture of eluate and sorbens material is pumped into decanter 17. From there, the solid material is moved by conveyor 18 into container 19, such as a roll-off container. Container 19 is removed by any permitted type of transportation means (e.g., truck). This solid waste contains substantially all of the substances extracted from the contaminated material. The solid waste from decanter 17 is generally characterized by the substances that prompted the clean-up and must be managed according applicable environmental laws and regulations. The volume of the substance generally amounts to less than 1.5% of the contaminated material entering the staging area 1.

The effluent from decanter 17 is accumulated in a tank or reservoir 20 and if determined to meet applicable environmental laws and regulations may be discharged through a valve at 21, or it may return into the water recirculation system through the valve at 22 in order to further clean contaminated material. Valve position 23 also allows fresh wash water to be added to the water recirculation system.

In one embodiment, mill 13 and adsorber/absorber 10 are installed in container 24 that is preferably waterproof. Container 24 also houses a control room 25 with a control panel 26 supplied by electric energy through an electrical panel or breaker box 27.

Figure 4B:
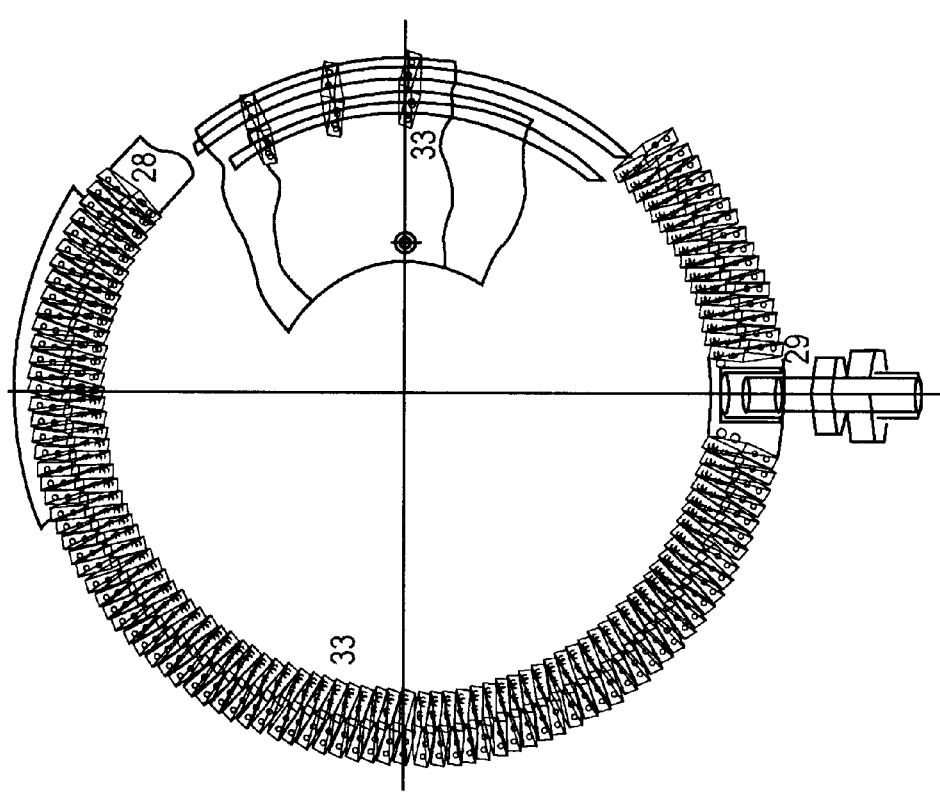
FIG. 4B is a diagrammatic plan view of the tool array illustrated in FIG. 4A in accordance with one embodiment of the invention.
Figure 4A:
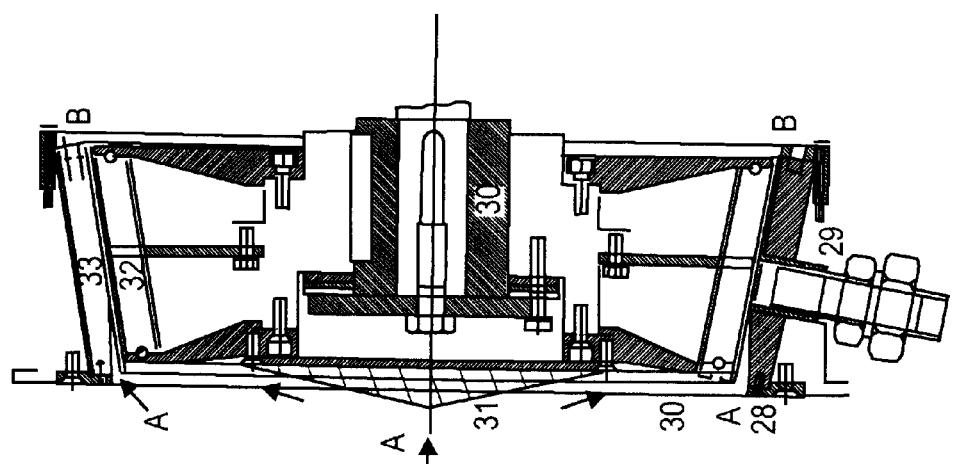
FIG. 4A is a sectional side view of a tool used in the grinding mill of FIG. 3 in accordance with one embodiment of the invention.

In one embodiment, grinding mill 3, adsorber/absorber 10, and mill 13 are equipped with different kinds of "tools." Grinding mill 3 has a beater disk as shown in FIG. 3 but it will be appreciated that pins may be used in grinding the contaminated material. Grinding mill 3 comprises a vortex rotor developed particularly for pulverizing lignite and the like. Adsorber/absorber 10 is equipped with a "tool" illustrated in FIGS. 4A and 4B. The "tool" consists of the stator 28, connected by the inlet hose 29 to pump 9 in which adsorber/absorber 10 receives the eluate, and of rotor 30. The sorbens material enters the adsorber/absorber 10 at A, an opening in the front door of the adsorber/absorber 10 illustrated in FIG. 3, and is guided by a conical cap 31 of the rotor 30 towards the grinding slit. The grinding slit is defined by blades 32 of rotor 30 and blades 33 of stator 28 that are arranged conically as indicated in FIG. 4B. It will be appreciated that adsorber/absorber 10 can be equipped with pins instead of a beater disk, although beater disks are preferred.

Figure 5:
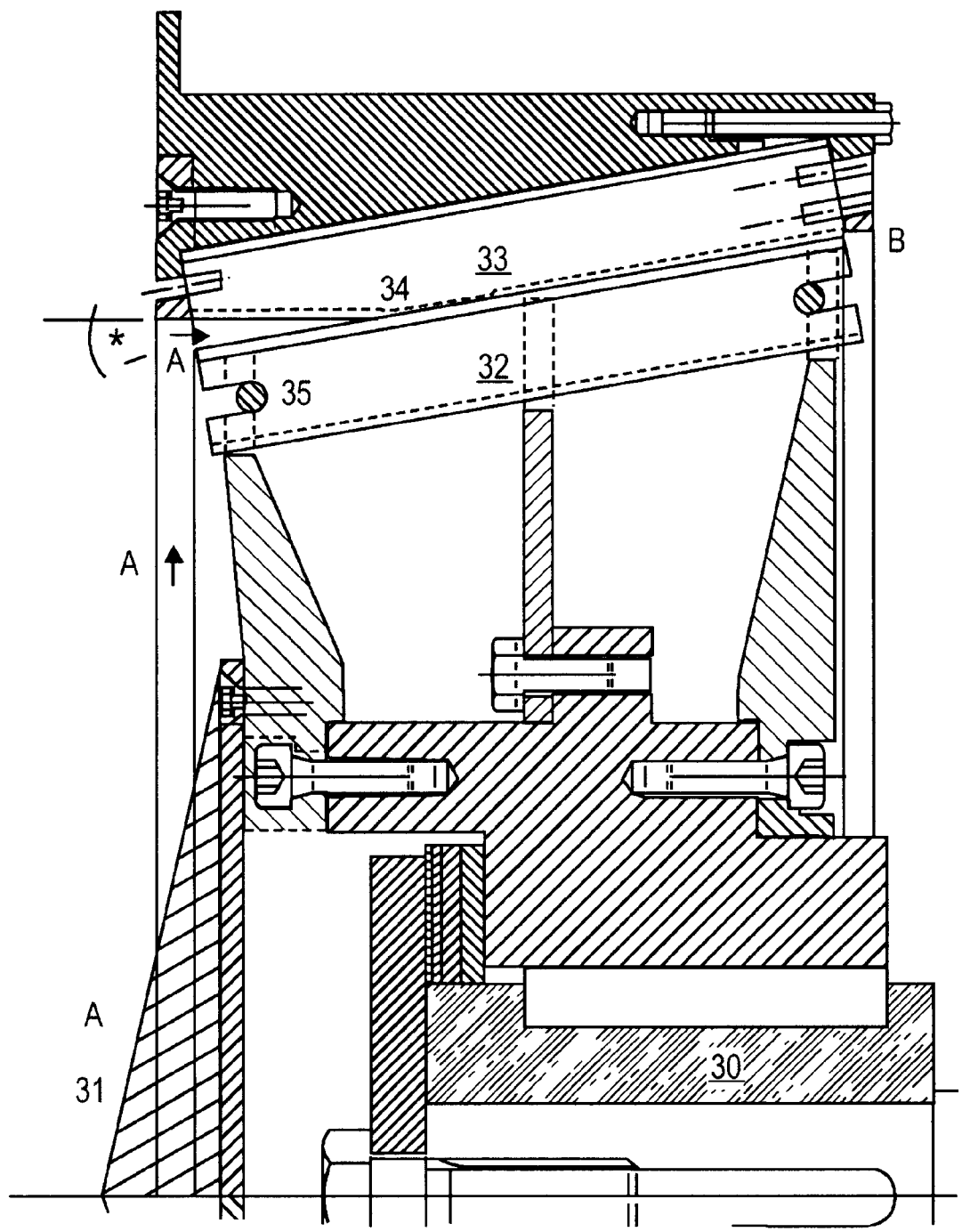
FIG. 5 is an enlarged partial sectional view of the grinding mill illustrated in FIG. 4A.

In FIG. 5, there is shown the upper half of FIG. 4B of the stator and the rotor in the grinding mill used in one embodiment. At 34 in blade 33 the grinding slit opens at an angle (*) This allows somewhat larger pieces and chunks (e.g., diameter up to several millimeters) to enter the narrow grinding slit defined by blades 32 and 33, respectively. The contaminated material to be treated enters at A and leaves the grinding slit at B. The position of point 34 and the angle (*) are chosen and defined by the kind of material (e.g., contaminated material, eluate, sorbens) to be treated. The blades 32 and 33 are designed to be secured by pins 35. Blades 32 and 33 are easily exchanged when needed, e.g., for sharpening, hardening treatment, and the like.

The distance of one pin from another pin can affect how quickly a contaminated material is decontaminated. The distance between one pin from another pin may be dependent upon the substance that is to be removed from the contaminated material. For example, assume substance A is characterized as a hazardous waste and substance B is petroleum. The distance between one pin to another pin may be 5 millimeters for substance A. In contrast, the distance from one pin to another pin may be 1 centimeter for substance B. It will be appreciated that determining the optimum distance from one pin to another pin for a particular substance may be determined through experimentation for each substance.

Figure 6:
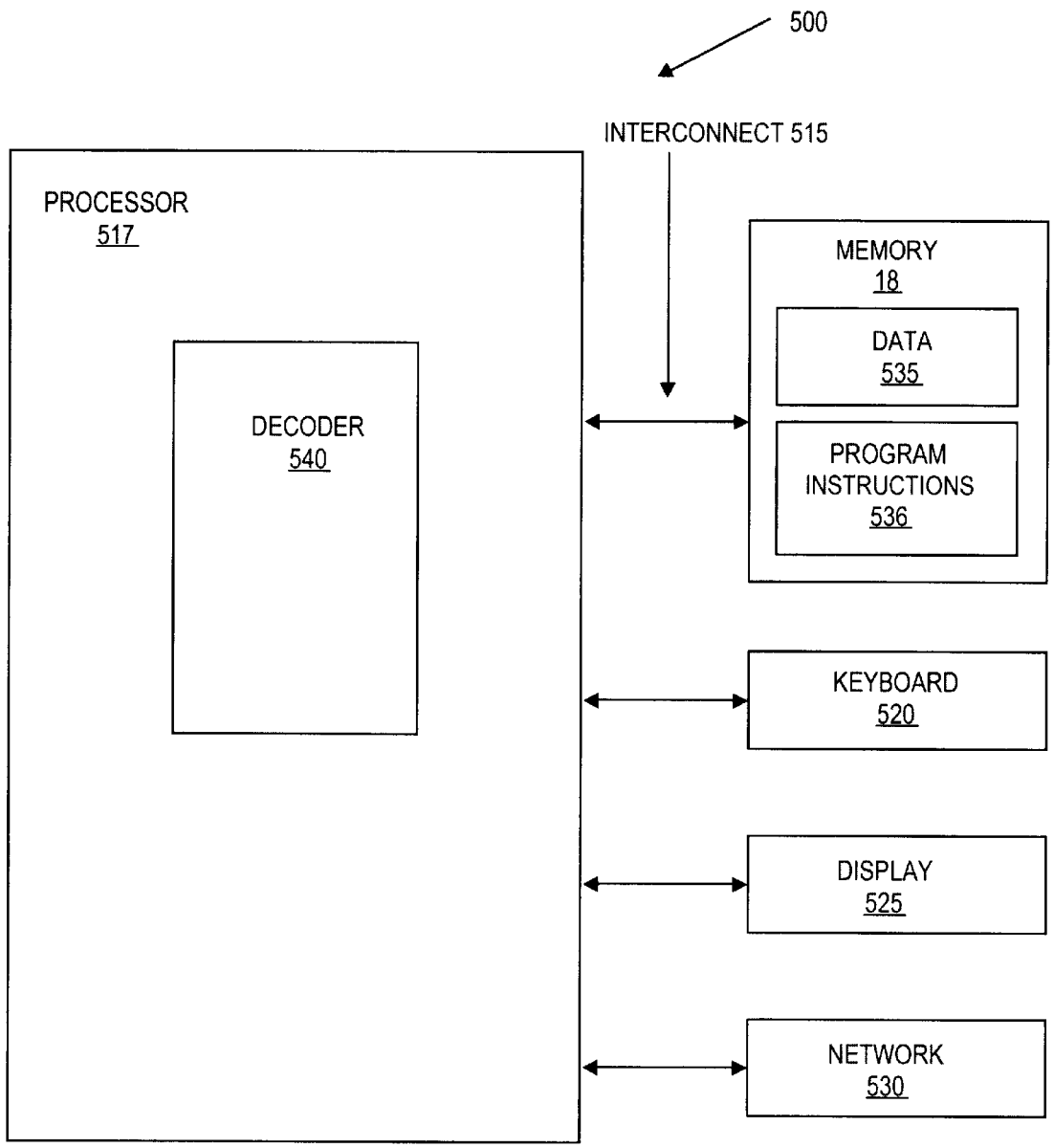
FIG. 6 illustrates a computer system that implements techniques of one embodiment of the invention.

FIG. 6 illustrates one embodiment of a computer system 510 which implements the principles of the invention. Computer system 510 comprises a processor 517, a storage device 518, and interconnect 515 such as bus or a point-to-point link. Processor 517 is coupled to the storage device 518 by interconnect 515. In addition, a number of user input/output devices, such as a keyboard 520 and a display 525, are coupled to chip set (not shown) which is then connected to processor 517. A user uses keyboard 520 and display 525 to input, for example, the name or other information (e.g., chemical abstract number, etc.) for a particular substance(s). This substance(s) is typically the substance(s) found in the contaminated material. The chipset (not shown) is typically connected to processor 517 using an interconnect that is different from interconnect 515.

Processor 517 represents a central processing unit of any type of architecture (e.g., the Intel architecture, Hewlett Packard architecture, Sun Microsystems architecture, IBM architecture, etc.), or hybrid architecture. In addition, processor 517 could be implemented on one or more chips. Storage device 518 represents one or more mechanisms for storing data such as the distance between pins for a particular type of substance. Storage device 518 may include read only memory (ROM), random access memory (RAM), magnetic disk storage media, optical storage media, flash memory devices, and/or other machine-readable media. Interconnect 515 represents one or more buses (e.g., accelerated graphics port bus, peripheral component interconnect bus, industry standard architecture bus, X-Bus, video electronics standards association related to buses, etc.) and bridges (also termed as bus controllers).

While this embodiment is described in relation to a single processor computer system, the invention could be implemented in a multi-processor computer system. In addition to other devices, one or more of a network 530 may be present. Network 530 represents one or more network connections for transmitting data over a machine readable media. The invention could also be implemented on multiple computers connected via such a network.

FIG. 6 also illustrates that the storage device 518 has stored therein data 535 and program instructions (e.g. software, computer program, etc.) 536. Data 535 represents data stored in one or more of the formats described herein. Program instructions 536 represents the necessary code for performing any and/or all of the techniques described with reference to FIGS. 1–5, and 7–8. For example, the program instructions are able to determine the particular distance one pin must be from another pin based upon the substance(s) found in the contaminated material. Program instructions may also determine the rpm of the pins (or beater disks) for a particular substance(s). Processor 517 sends a signal to an actuator (not shown) coupled to the pins on the grinding mill to automatically adjust the pins in the grinding mill in order to optimize the decontamination process.

Program instructions 536 also may be used to adjust the amount of water flowing in and out of the grinding mill. Additionally, grinding mill may adjust the amount of contaminated material fed into the grinding mill. Program instructions 536 may also regulate the amount of sorben material and inert gas that is used in the decontamination process. By operating in this manner, the decontamination process is almost entirely automatic. In addition to program instructions 536, storage device 518 preferably contains additional software (not shown), which is not necessary to understanding the invention.

FIG. 6 additionally illustrates that the processor 517 includes decoder 540. Decoder 540 is used for decoding instructions received by processor 517 into control signals and/or microcode entry points. In response to these control signals and/or microcode entry points, decoder 540 performs the appropriate operations.

Figure 7:
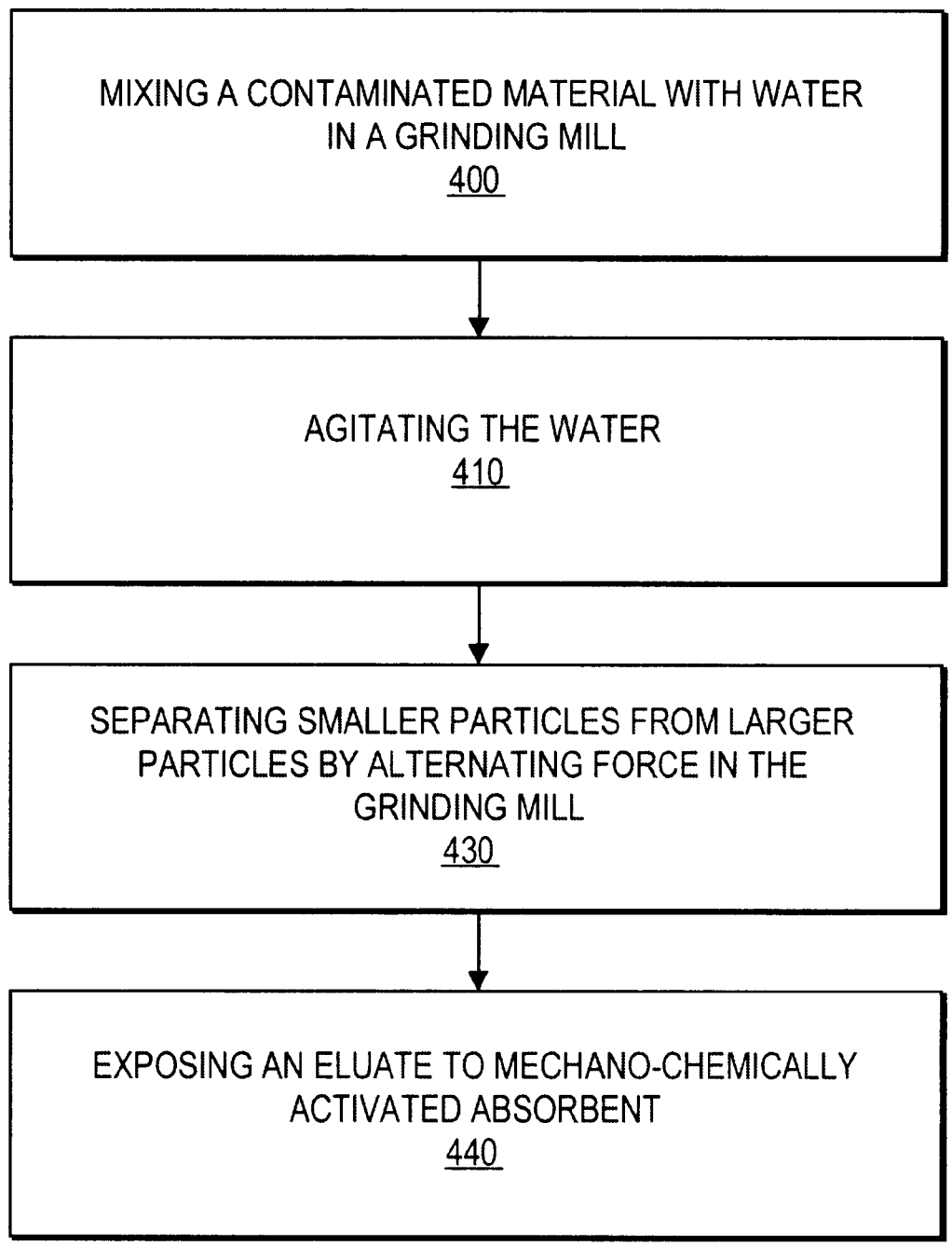
FIG. 7 illustrates a flow diagram of one method in accordance with one embodiment of the invention.

FIG. 7 illustrates a flow diagram of one method in accordance with one embodiment of the invention. At block 400, a contaminated material is mixed with water in a wet-type mixing and grinding mill. At block 410, the water is agitated. At block 430, larger particles are separated from smaller particles by alternating forces acting in the mixing and grinding mill. At block 440, the contaminated water is exposed to a mechano-chemically activated adsorbent.

Figure 8:
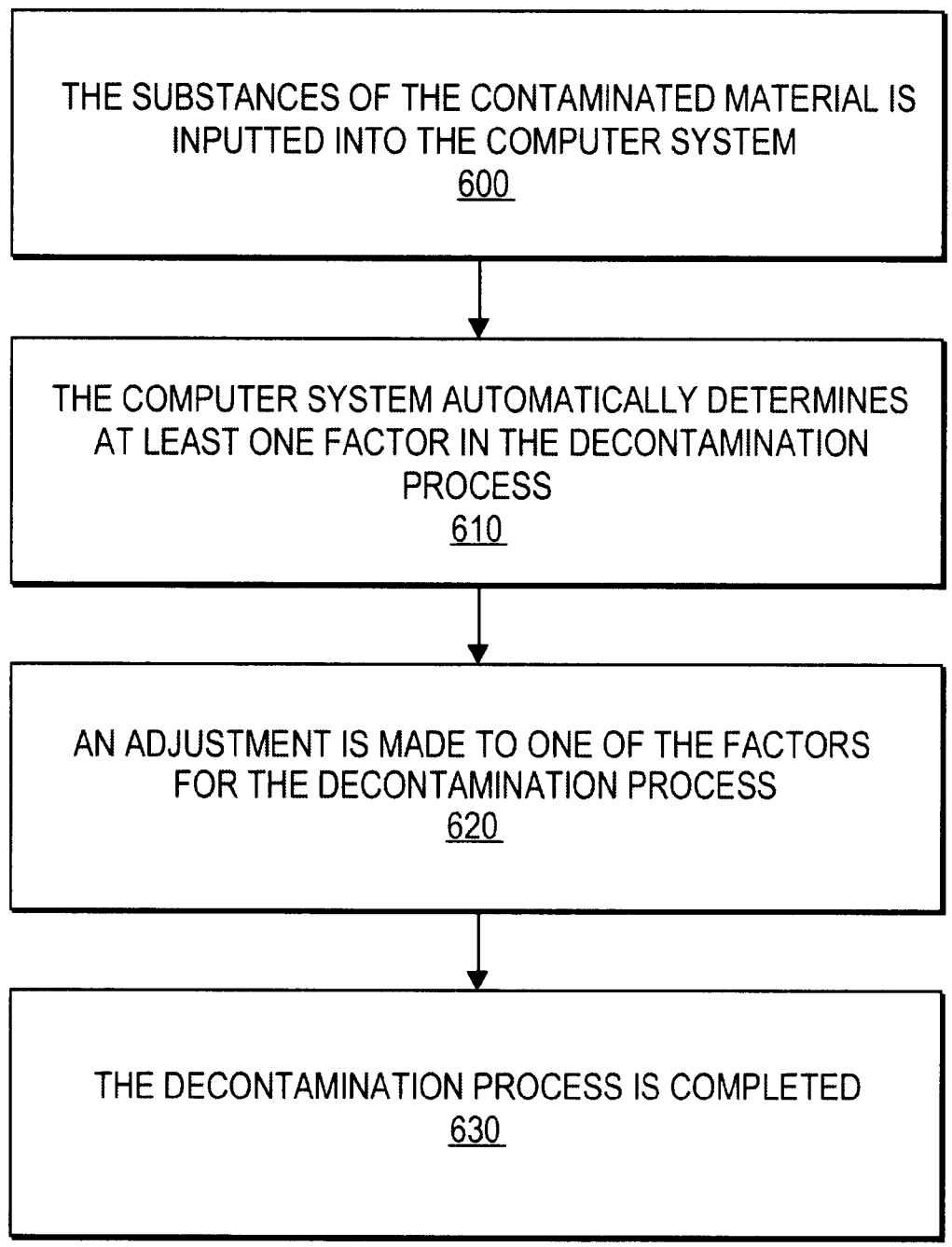
FIG. 8 illustrates a flow diagram of one method in accordance with one embodiment of the invention.

FIG. 8 illustrates another flow diagram in accordance with one embodiment of the invention. At block 600, the substance(s) in the contaminated material is inputted into a computer system. At block 610, the computer system automatically sets at least one operating condition in the decontamination process. For example, the computer system may determine the distance that must exist between a first pin and a second pin of a plurality of pins in the grinding mill in order to optimize the decontamination process of the contaminated material. Additionally, the RPM of the pins or beater disk for a particular substance may be determined. Another operating condition that may be adjusted is the amount of water added into the grinding mill to decontaminate the contaminated material. Another operating condition may be adjusted to the amount of contaminated material fed into the grinding mill to be decontaminated. Additionally, the amount of sorbens material or inert gas that is added for the decontamination process may be determined by the computer system. At block 620, an adjustment is made to one of the operating conditions of the decontamination process. For example, the pins may be automatically moved in relation to one another in order to optimize the decontamination process. At block 630, the decontamination process is completed.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   mixing a contaminated material with agitated water in a mixing and grinding mill;
   agitate the mixture of the contaminated material and water;
   separating larger particles from smaller particles by alternating forces in the mixing and grinding mill; and
   exposing an eluate to at least one mechano-chemically activated sorbens material.

2. The method of claim 1, wherein the contaminated material contains one of hazardous waste, hazardous constituent, pollutant, contaminant, hazardous substance, hazardous material, petroleum, and crude oil.

3. The method of claim 1, wherein the sorbens material is lignite.

4. The method of claim 1, wherein the sorbens material is one of a solid phase, a liquid phase, and a gaseous phase.

5. The method of claim 1, further comprising, prior to exposing the eluate to the at least one sorbens material, pulverizing the at least one sorbens material in an atmosphere of inert gas.

6. The method of claim 1, further comprising:
   adjusting a pH of the eluate to a weak alkaline range.

7. The method of claim 6, wherein the adjusting operation comprises adding one of an acid and a base to adjust the pH in a range of about 8 to 11.

8. A system comprising:
   a wet-type mixing and grinding mill to receive a contaminated material;
   the mixing and grinding mill having an inlet formed therein, wherein the material is mixed in the mill with water entering through said inlet; and
   a sorption device coupled to an outlet of the mixing and grinding mill and adapted to receive an eluate from the mixing and grinding mill, the sorption device comprising one of an adsorber and absorber.

9. The system of claim 8, a dewatering device is connected to a grinding mill.

10. The system of claim 8, wherein an adsorber/absorber is coupled to the dewatering device.

11. The system of claim 8, wherein the sorbens device comprises a pulverized sorbens material.

12. The system of claim 8, wherein the sorption device further comprises grinding means.

13. A method comprising:
    mixing a contaminated material with agitated water in a mixing and grinding mill;
    agitate the mixture of the contaminated material and water;
    separating larger particles from smaller particles by alternating forces in the mixing and grinding mill;
    exposing an eluate to mechano-chemically activated sorbens material; and
    separating the eluate from decontaminated material.

14. The method of claim 13, wherein the contaminated material contains one of hazardous waste, hazardous constituent, pollutant, contaminant, hazardous substance, hazardous material, petroleum, and crude oil.

15. The method of claim 13, wherein the sorbens material has an average particle size less than 17.5 millimeters in diameter.

\* \* \* \* \*